INVENTOR.
Samuel L. Williams
BY
Frank E. Miller
ATTORNEY

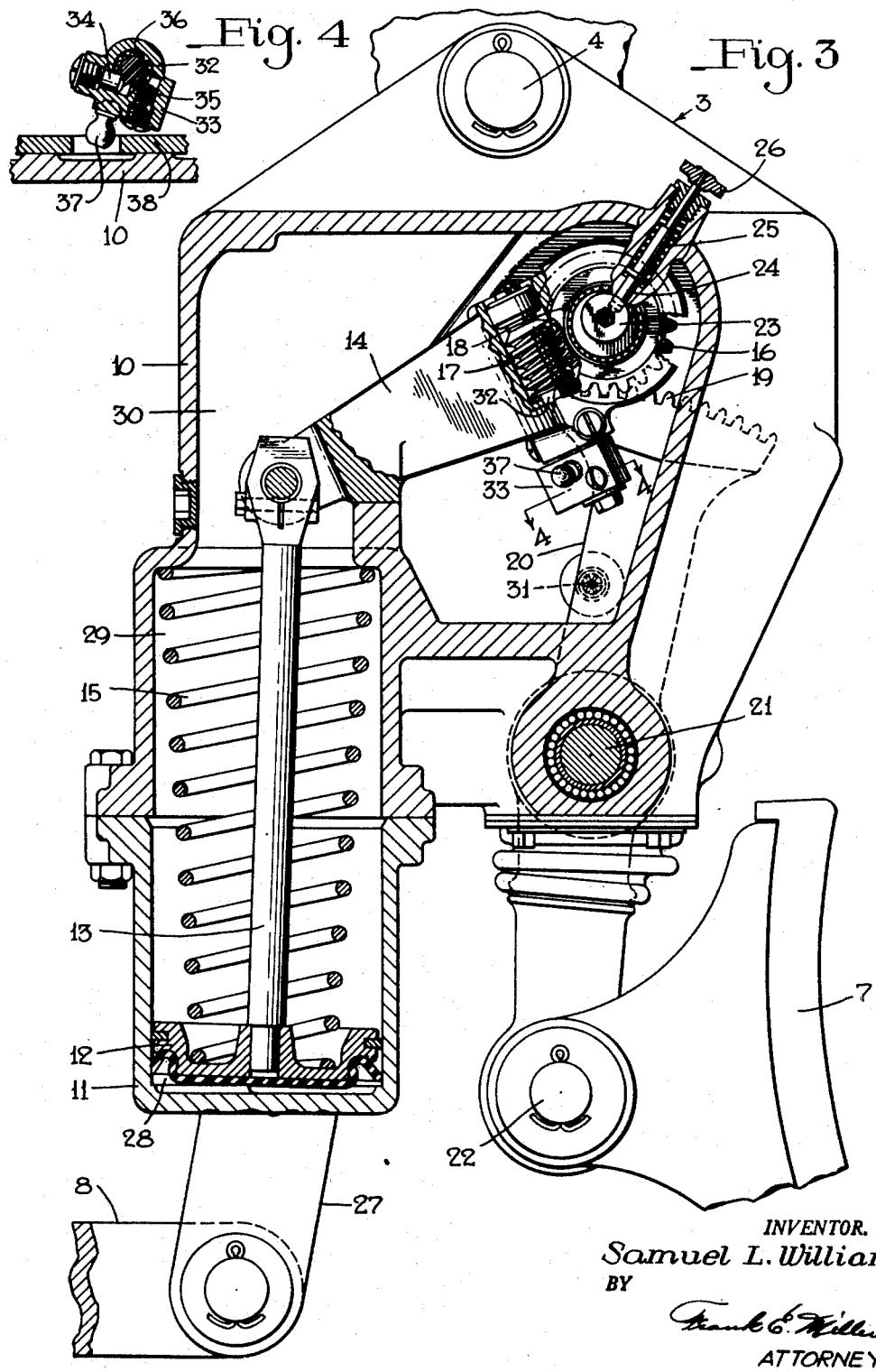

Patented July 24, 1951

2,561,454

UNITED STATES PATENT OFFICE 2,561,454

BRAKE MECHANISM

Samuel L. Williams, New York, N. Y., assignor to The Westinghouse Air Brake Company, Wilmerding, Pa., a corporation of Pennsylvania Application April 16, 1949, Serial No. 87,948

6 Claims. (Cl. 188—53)

This invention relates to brake mechanism and more particularly to the fluid pressure controlled type for controlling braking of a railway vehicle or the like.

In the copending application of Arthur J. Bent and myself, Serial No. 74,666, filed February 4, 1949, there is disclosed what is known as a unit brake structure comprising a brake cylinder device and brake shoe operatively connected to the brake cylinder device, said unit structure being arranged for mounting as a unit on a truck frame for braking a wheel. If it is desired to brake each wheel of the truck with a single brake shoe, one of these unit structures is required for each wheel. If it is desired to brake both sides of each wheel, as in conventional clasp brake arrangements, two of these structures are required for each wheel. This unit brake structure was conceived to eliminate massive brake rigging employed under cars with conventional brake equipment and to thereby reduce the overall weight of the car, to provide a structure which would be more efficient and have longer life and which also could be more readily applicable to cars where available space for any such auxiliary apparatus is already at a premium.

The principal object of the invention is the provision of an improved brake mechanism embodying a unit brake structure such as above mentioned but so arranged as to provide with one of said structures twice the amount of braking effort thereby reducing to one half the number of such structure required per car truck to provide a chosen degree of braking, reducing to substantially one half the amount of fluid under pressure required to provide said chosen degree of braking and providing a brake mechanism of lighter weight and requiring less space on the truck for application and therefore more readily applicable to the truck.

Figure 1:
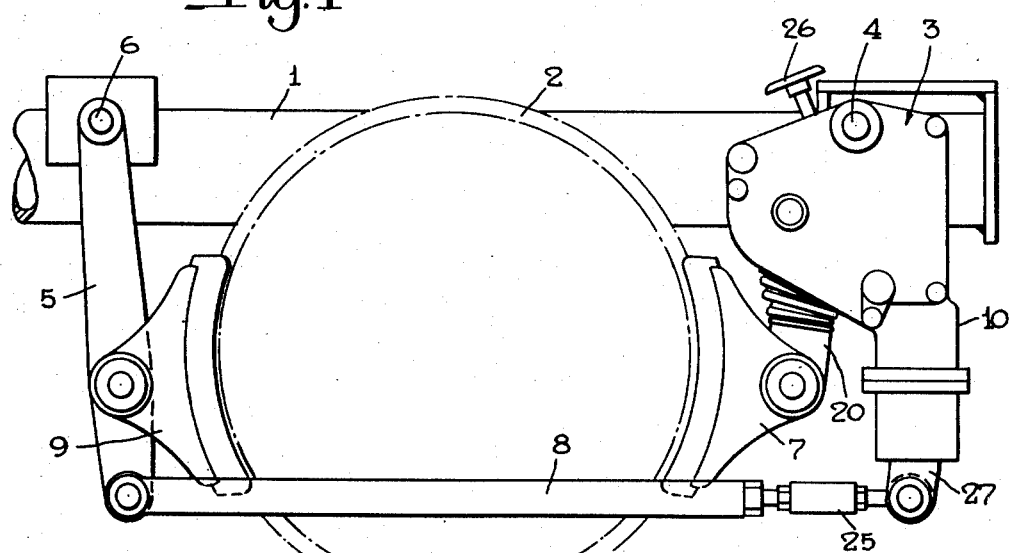
Figure 2:
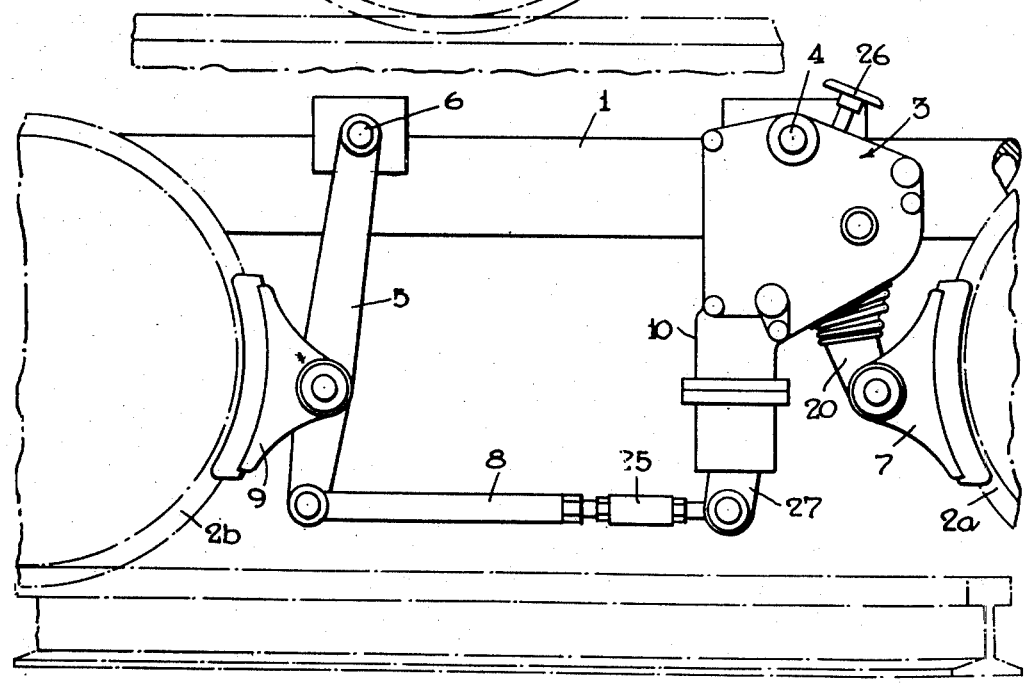

Other objects and advantages of the invention will become apparent from the following more detailed description thereof taken with reference to the accompanying drawings, wherein:

Fig. 1 is a schematic, elevational view of a portion of a railway vehicle truck and of a clasp type brake shoe mechanism embodying the invention and shown mounted on said truck; Fig. 2 is a view similar to Fig. 1 but of a single shoe (per wheel) type of brake mechanism embodying the invention; Fig. 3 is a vertical, sectional view of a brake operating structure forming a part of the mechanism shown in Figs. 1 and 2; and Fig. 4 is a sectional view taken along line 4—4 of Fig. 3.

Description—Fig. 1

As shown in the drawing, the portion of the railway vehicle truck employed for illustrating a use of the invention comprises a side frame 1 adapted to be supported by a wheel 2, both of the usual structure, while the brake mechanism embodying one form of the invention comprises a vertically arranged brake structure 3 disposed at one side of said wheel and pivotally mounted at its upper end on a pin 4 secured to said frame, and a vertically arranged brake lever 5 disposed at the opposite side of said wheel and pivotally mounted at its upper end on a pin 6 also secured to said frame. The brake structure 3 carries a brake shoe 7 disposed for braking engagement with the one side of wheel 2. The lower end of structure 3 is pivotally connected by a tie rod 8 to the lower end of lever 5. Lever 5 carries a brake shoe 9 disposed at the opposite side of wheel 2 for braking engagement therewith, the two brake shoes 7 and 9 being arranged in clasp relation to said wheel.

The brake structure 3 may be similar to that fully disclosed and described in the copending application of Arthur J. Bent and myself, Serial No. 74,666, filed February 4, 1949, to which application reference may be made for a detailed description of the structure. Briefly, however, the brake structure 3 comprises (Fig. 3) a housing 10 pivotally supported at its upper end to the truck frame on pin 4 and including at its lower end a separable brake cylinder device 11, containing a brake piston 12 connected by a piston rod 13 to a lever 14. At one side of the brake cylinder piston 12 is a chamber 28 adapted to receive fluid under pressure while at the opposite side of said piston is a chamber 29 open to a chamber 30 in the housing and thence to atmosphere by way of a fitting 31. A release spring 15 located in chamber 29 is interposed between piston 12 and the housing 10 to urge said piston toward a brake release position in which it is shown in the drawing. The lever 14 is connected by a wear compensating device to a pinion 16 journaled on an eccentric shaft 23 carried by the housing 10 and which pinion normally engages a gear sector 19 provided on the end of a lever 20, said lever being pivotally mounted approximately midway between its extremities on a pin 21 supported in said housing. The end of lever 20 opposite the gear sector 19, that is the lower end, is disposed outside the housing 10 and carries the brake shoe 7 on a suitable pin 22.

The wear compensating device comprises a worm gear 17 located in a suitable bore in the lever 14 with an operating stem 32 of smaller diameter than the worm gear 17 extending through an opening in the lever for connection with an operating mechanism 33, which as shown in Fig. 4, comprises a body journaled on stem 32 and having two pawls 34 and 35 for engaging teeth 36 of said stem 32. The body is provided with an operating lug 37 which extends outwardly from said body into a suitable slot provided in a plate member 38 secured to the housing 10. The lug 37 and the slot in plate member 33 are arranged such that when effecting a brake application as will be hereinafter described, if lever 14 is rotated beyond a certain position as will be explained hereinafter, the lug 37 will engage one end of the slot in member 38 to rotate the body relative to gear 17 in a direction to cause either or both pawls 34 and 35 to pass over one or more of the teeth 36 on shaft 32. As the lever 14 is returned to release position which also will be hereinafter brought out, the lug 37 is adapted to engage the opposite end of the slot in member 38 and rotate the body, shaft 32 and gear 17 in the opposite direction for reasons to be explained hereinafter. The gear 17 engages suitable teeth on pinion 16 which is adapted to be rotated relative to lever 14 by turning of worm gear 17.

As above mentioned, the pinion 16 is journaled in the housing on an eccentric shaft 23 which upon rotation is adapted to effect either engagement or disengagement of pinion 16 with the gear sector 19. The shaft 23 is normally locked in a position causing engagement of the pinion 16 and gear sector 19 by a lock pin 24 which is slidably fitted into a suitable bore in housing 10 and a suitable bore in one end of the eccentric shaft 23. A spring 25 is interposed between pin 24 and the housing and is effective to normally urge said pin to the position just mentioned. Lock pin 24 is provided on its outer end with a suitable knob 26 for pulling said pin out of the shaft 23 to permit turning of said shaft to move the pinion 16 out of driving relation with sector 19.

A lug 27 depending from the housing 10, and preferably from the brake cylinder device 11 is provided for connection at its lower end to the tie rod 8 which rod includes a turn buckle 25 which permits adjustment of the length of said tie rod to adjust the spacing of the shoes 7 and 9 with respect to opposite sides of the wheel 2.

*Operation—Fig. 1*

If it is desired to move the brake shoes 7 and 9 into frictional braking engagement with the wheel 2 to effect retardation thereof, fluid under pressure is supplied in the usual manner to chamber 28 of the brake cylinder device 11 wherein it acts on the piston 12 to move said piston against spring 15 and rotate lever 14 and pinion 16 clockwise about shaft 23. By reason of the engagement of pinion 16 with segment 19, the lever 20 is thereby caused to rotate about pin 21 and to move brake shoe 7 into frictional contact with one side of the wheel 2, whereupon due to reaction of said shoe, continued movement of the brake cylinder piston 12 turns the housing 10 on pin 4 and thereby operates the lug 27, tie rod 8 and lever 5 to move brake shoe 9 into braking engagement with the opposite side of wheel 2. After the brake shoes 7 and 9 are thus moved into engagement with the wheel 2, further increase in pressure of fluid in chamber 28 acting on piston 12 acts to urge said shoes against said wheel with force to effect braking thereof.

If while effecting the application of brake forces to the wheel, as just described, the travel of the brake piston 12 and hence the rotation of lever 14 exceeds a fixed amount, the lug 37 will engage one end of the slot in member 38 and the body of the operating mechanism 33 will be rotated counterclockwise, as viewed in Fig. 4, to cause either or both the pawls 34 and 35 to pass over one or more teeth 36 on the stem 32, depending upon the amount of wear of the brake shoes 7 and 9. When the brake application is released by the venting of fluid pressure from the pressure chamber 28, in the usual manner, the release spring 15 will return the piston 12 and thereby the lever 14 to the brake release position as shown in Fig. 3. Before reaching the release position, the lug 37 will engage the opposite end of the slot in member 38 by reason of the body being rotated counterclockwise during the brake application. Then as the lever 14 is returned to the release position, the lug 37 will cause rotation of the operating mechanism 33 in a clockwise direction. By reason of one of the pawls 34 and 35 engaging a tooth on stem 32, said stem will thereby be turned by the operating mechanism to cause the worm gear to rotate the pinion 16 clockwise relative to the lever 14 and thus operate the lever 20 to move the brake shoe 7 relative to lever 14 toward the wheel 2 to thus compensate for wear of the brake shoes while against said wheel.

It will be noted that the brake piston 12 is effective to apply both brake shoes 7 and 9 to the wheel for braking same and that the brake shoe wear compensating mechanism is then effective to compensate for wear of either or both shoes.

When replacing worn brake shoes it will be necessary to manually readjust the lever 20 to the greater thickness of the new shoes. To obtain this adjustment, the operator will unlock the eccentric shaft 23 by operating the button 26 to pull pin 24 out of said shaft against the force of spring 25, and then, by the use of a suitable wrench, rotate said shaft to move pinion 16 out of engagement with sector 19, thus freeing the lever 20 to permit sufficient clearance between said lever and wheel 2 to allow for the extra thickness of the new shoe over the worn shoe thickness.

Reduced wheel diameter due to wear can be manually compensated for by adjustment of the length of tie rod 8 by the turn buckle 25.

While I have described an application of the invention in a clasp brake mechanism for a single wheel, it may also be employed for applying oppositely acting brake shoes to two wheels, as will now be described.

*Description—Fig. 2*

In this arrangement, the brake structure 3 and lever 5 are disposed between two wheels 2a and 2b of a truck with said structure turned over, side for side, with respect to the arrangement shown in Fig. 1 and with the brake shoes 7 and 9 correspondingly turned for cooperation with the adjacent sides of said wheels. The tie rod 8 in this embodiment constitutes a compression element instead of a tension element as in the structure shown in Fig. 1. Otherwise the brake mechanism shown in Figs. 1 and 2 are the same.

*Operation—Fig. 2*

In operation, the brake mechanism shown in Fig. 2 will operate in response to supply of fluid under pressure to the pressure chamber 28 of the brake cylinder device 11 to move the brake shoe 7 into braking engagement with the wheel 2a and then rock the housing 10 of the brake structure 3 to exert a counter-force via the tie rod 8 against lever 5 and brake shoe 9 to move the latter brake shoe into braking engagement with wheel 2b. After the shoes engage the braking surfaces of the respective wheels, any further increase in the pressure of fluid in chamber 26 of the brake cylinder device will result in increased braking force, said braking force being proportional to the pressure of fluid supplied to said chamber in the same manner as in the structure shown in Fig. 1.

The wear compensating mechanism of the brake structure 3 will operate with the brake mechanism shown in Fig. 2 to compensate for wear of brake shoes 7 and 9 the same as in the structure shown in Fig. 1.

Also, the turn buckle 25 in the tie rod 8 is effective to compensate for wear of the wheels 2a and 2b in the same manner as it compensated for the wear of the one wheel 2 of the structure shown in Fig. 1.

Summary

From the above description, it is apparent that I have provided an improved, simple and compact brake mechanism not requiring conventional brake rigging under a car and which is arranged to be mounted on a side frame of a truck, in the space usually occupied by brake levers of a conventional brake arrangement, for braking cooperation with one or more wheels of the truck.

Having now described my invention, what I claim as new and desire to secure by Letters Patent, is:

1. A brake apparatus for a railway vehicle truck, comprising a lever having a fixed pivot, a brake shoe carried by said lever, a rigid rockable structure having a fixed pivot, means connecting said structure to said lever for operating said lever and shoe by pivotal movement of said structure, a lever pivoted in said structure with one end disposed inside of said structure and the other end disposed outside of the structure, a brake shoe carried by said other end of the last named lever, and a brake cylinder piston enclosed within said structure connected to said one end of said last named lever for operating said last named lever and the connected shoe relative to said structure and said structure relative to the last named lever.

2. A brake apparatus for a railway vehicle truck, comprising a lever having a fixed pivot, a brake shoe carried by said lever, a rigid rockable structure having a fixed pivot, means connecting said structure to said lever for operating said lever and shoe by pivotal movement of said structure, a lever pivoted in said structure with one end disposed inside of said structure and the other end disposed outside of the structure, a brake shoe carried by said other end of the last named lever, a brake cylinder piston enclosed within said structure, and leverage means enclosed within said structure operatively connecting said piston to said one end of the last named lever.

3. A brake apparatus for a railway vehicle truck, comprising a lever having a fixed pivot, a brake shoe carried by said lever, a rigid rockable structure having a fixed pivot, means connecting said structure to said lever for operating said lever and shoe by pivotal movement of said structure, a lever pivoted in said structure with one end disposed inside of said structure and the other end disposed outside of the structure, a brake shoe carried by said other end of the last named lever, a brake cylinder piston enclosed within said structure and leverage means including automatic slack take-up means enclosed within said structure and operatively connecting said piston to said one end of the last named lever.

4. A brake apparatus for a railway vehicle truck, comprising a lever having a fixed pivot, a brake shoe carried by said lever, a rigid rockable structure having a fixed pivot, means connecting said structure to said lever for operating said lever and shoe by pivotal movement of said structure, a lever pivoted in said structure with one end disposed inside of said structure and the other end disposed outside of the structure, a brake shoe carried by said other end of the last named lever, a gear rack on the said one end of the last named lever formed concentric with the pivot of such lever, a gear journaled within said structure having driving engagement with said rack, a lever enclosed within said structure connected to turn said gear, and a brake cylinder piston enclosed within said structure connected to operate the last named lever.

5. A brake apparatus as defined in claim 1 in which the brake shoes are arranged to clasp braking relation to each other and the means connecting said structure to the first named lever is a tension means.

6. A brake apparatus as defined in claim 1 in which the brake shoes are arranged with their braking faces opposite each other and the means connecting said structure to the first named lever is in the form of a compression rod.

SAMUEL L. WILLIAMS.

REFERENCES CITED

The following references are of record in the file of this patent:

UNITED STATES PATENTS

| Number | Name | Date |
| --- | --- | --- |
| 315,973 | Strong | Apr. 14, 1885 |
| 1,681,058 | Sauvage | Aug. 14, 1928 |
| 2,267,656 | Jeffrey | Dec. 23, 1941 |
| 2,273,634 | Frede | Feb. 17, 1942 |